United States Patent [19]
Davis, Jr. et al.

[11] Patent Number: 6,076,851
[45] Date of Patent: Jun. 20, 2000

[54] AIRBAG SURROUND FOR SEAMLESS INSTRUMENT PANEL

[75] Inventors: Joseph J. Davis, Jr., Ortonville; John H. Faarup, Rochester Hills; Jack Samuel Palazzolo, Dearborn, all of Mich.

[73] Assignee: Lear Corporation, Southfield, Mich.

[21] Appl. No.: 09/071,181

[22] Filed: May 1, 1998

[51] Int. Cl.[7] .................................................. B60R 21/16
[52] U.S. Cl. ....................................... 280/728.2; 280/732
[58] Field of Search .............................. 280/728.2, 728.3, 280/731, 732

[56] References Cited

U.S. PATENT DOCUMENTS

| | | | |
|---|---|---|---|
| 5,280,947 | 1/1994 | Cooper | 280/728.3 |
| 5,292,151 | 3/1994 | Parker | 280/728.3 |
| 5,421,608 | 6/1995 | Parker et al. | 280/728.3 |
| 5,447,327 | 9/1995 | Jarboe et al. | 280/728.3 |
| 5,447,328 | 9/1995 | Iannazzi et al. | 280/728.3 |
| 5,698,283 | 12/1997 | Yamasaki et al. | 428/43 |

*Primary Examiner*—Paul N. Dickson
*Attorney, Agent, or Firm*—McMillan, Sobanski & Todd, LLC.

[57] ABSTRACT

An unique airbag support assembly for an instrument panel airbag is formed of a unitary design. The airbag support assembly has a door flap which is secured by a flexible hinge member to an outer rim. The outer rim includes a support structure for supporting an airbag module. The outer rim and door flap are secured to an under face of the instrument panel by a welding technique. The instrument panel is formed with a tear seam on its under face, but no tear seam is formed on its front face.

20 Claims, 1 Drawing Sheet

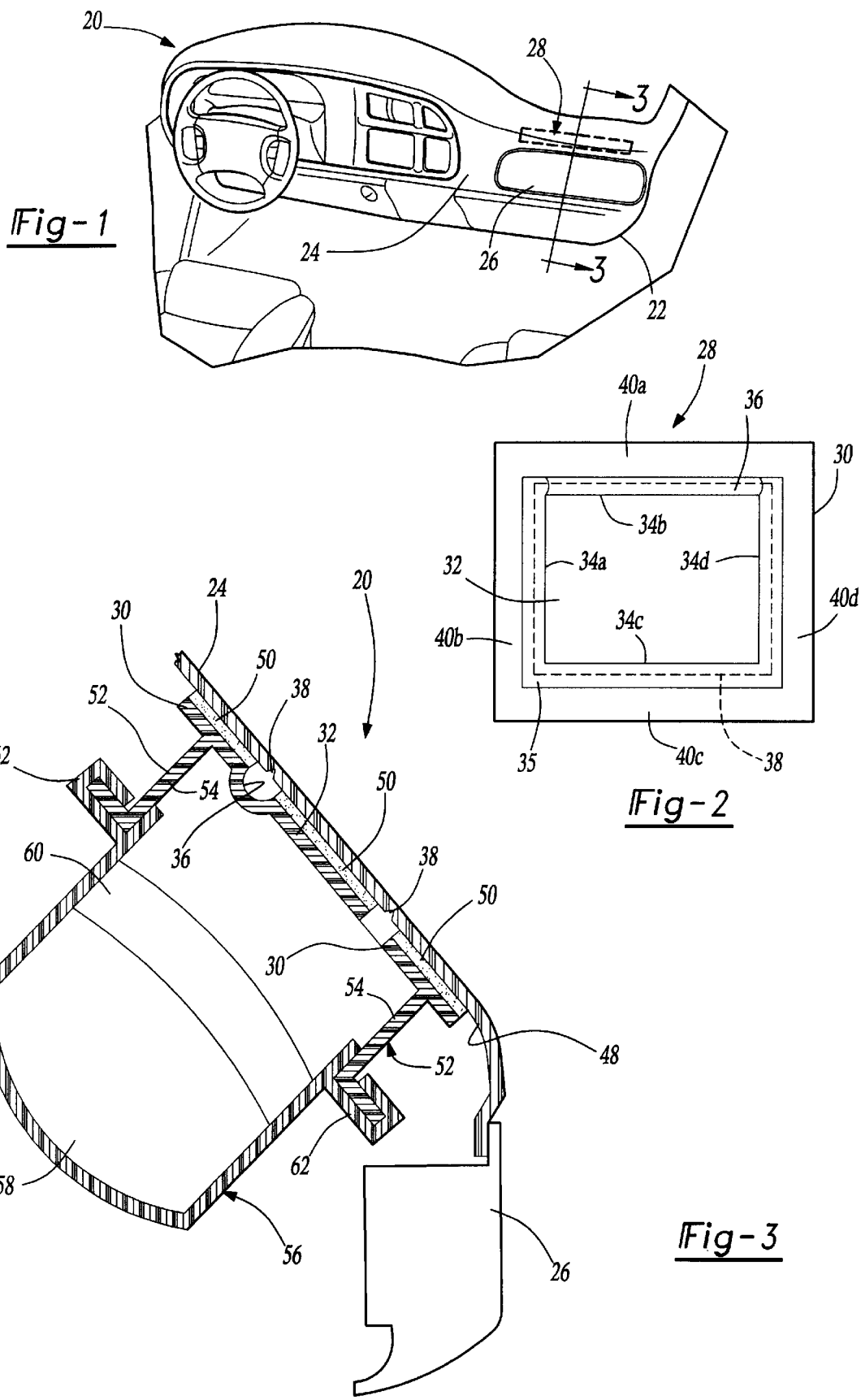

AIRBAG SURROUND FOR SEAMLESS INSTRUMENT PANEL

BACKGROUND OF THE INVENTION

This invention relates generally to an airbag support assembly for a vehicle airbag which provides a seamless instrument panel.

Incorporation of airbags into vehicles has created many design challenges for automotive designers. It is desirable to incorporate an airbag into an instrument panel in front of the vehicle passenger seat. When incorporating an airbag into an instrument panel it is necessary to provide an airbag cover that will reliably and safely tear, such that the passenger is protected. To this end, a tear seam has generally been provided in an instrument panel cover to insure that the airbag will safely deploy.

Vehicle designers prefer to have a continuous surface on the front face of the instrument panel whenever possible, so they would prefer to avoid having a tear seam in the instrument panel. Thus, recently there has been an effort to achieve a "seamless" design wherein there is no indication on the front face of the instrument panel that the airbag is behind the instrument panel. To achieve this design, tear seams or tear strips provided in the instrument panel are only provided on the under face, and not on the front face of the instrument panel.

A major design challenge with such "seamless" designs has been to provide an appropriate airbag support assembly for supporting the airbag before, during and after deployment through the instrument panel. Typically the airbag support assembly has been tailored to specific instrument panel configurations because the airbag support assembly is an integral part of the instrument panel itself. The instrument panel often requires additional support members near the airbag support assembly and the airbag support assembly must fit between these additional support members. Another challenge is that when the configuration of an instrument panel is changed, frequently the airbag support assembly must also be redesigned to fit in the new instrument panel.

Thus, it is desirable to create an airbag support assembly for an airbag that is independent of the instrument panel and that is standardized so that it can be incorporated in the "seamless" design of a variety of instrument panel configurations. Preferably, such an airbag support assembly would be simpler in design than current airbag support assemblies and permit a reduction in the number of additional support members currently used to support instrument panels adjacent to the airbag. Such a design would be readily adaptable to changes in the styling and configuration of the instrument panel.

SUMMARY OF THE INVENTION

In a disclosed embodiment of this invention, an airbag support assembly includes an outer rim that surrounds a door flap spaced inwardly from the outer rim. A hinge member connects an outer edge of the door flap to a side of the outer rim. A support structure for supporting an airbag module is secured to the outer rim of the airbag support assembly. A space between the door flap and the outer rim is designed to overlie a tear seam located on an under face of an instrument panel. The airbag support assembly provides a standardized assembly that has a support structure for supporting an airbag that is independent of the instrument panel and that permits incorporation of an airbag module into a variety of "seamless" instrument panel designs.

In one embodiment of the invention, an airbag support assembly as described above is secured to an instrument panel. The outer rim and door flap are connected to an under face of the instrument panel by ultrasonic or vibration welding techniques. These welding techniques provide a very reliable connection insuring that the outer rim and door flap will not separate from the instrument panel during deployment of an airbag. The support structure extends rearwardly from the outer rim and provides support for an airbag module containing the airbag. The welding of the outer rim and the door flap to the instrument panel provides a design that does not require additional supporting members for supporting the instrument panel adjacent to the airbag module.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 1 is a front view of an instrument panel having an airbag assembly designed according to the p resent invention.

FIG. 2 is a top plan view of the airbag assembly.

FIG. 3 is a cross-sectional view along line 3—3 of FIG. 1.

DETAILED DESCRIPTION OF THE PREFERRED EMBODIMENT

A vehicle instrument panel is shown generally at 20 in FIG. 1. The vehicle instrument panel 20 includes an instrument panel body 22 having a front, or show face 24 and a glove box 26. Shown in phantom outline is an airbag support assembly 28 located behind the front face 24.

FIG. 2 is a top plan view of the airbag support assembly 28. The airbag support assembly 28 has an outer rim 30 and door flap 32. The door flap 32 has a plurality of outer edges 34a–d and the outer rim 30 has a plurality of sides 40a–d. A flexible hinge member 36 connects one of the outer edges 34b to one of the sides 40a of the outer rim 30. The outer edges 34a–d are spaced inwardly from the outer rim 30, which creates a gap 35 between the outer rim 30 and all of the outer edges 34a–d. The gap 35 overlies a tear seam 38 that is shown in phantom outline in relation to the outer rim 30 and the door flap 32. The tear seam 38 is located on an under surface of the instrument panel body 22. The hinge member 36 is shown as contiguous along substantially the entire length of an outer edge 34b. As will be understood by one of ordinary skill in the art, the hinge member 36 could be formed of multiple spaced apart hinges along the outer edge 34b or it could be formed of a single hinge that did not extend along the entire length of the outer edge 34b. Although the hinge member 36 is shown as having a U-shape in cross-section, other shapes may be used, for example, the hinge member 36 could have a V-shaped cross-section.

FIG. 3 is cross-sectional view along line 3—3 of FIG. 1. The instrument panel body 22 has an under face 48 opposite the front face 24. A welded joint 50 secures the outer rim 30 and the door flap 32 to the under face 48. A support structure 52 extends rearwardly from the outer rim 30. The support structure 52 includes a pair of L-shaped brackets 54. An airbag module 56 having an airbag inflator 58 and an airbag 60 is located behind the door flap 32. The airbag module 56, airbag inflator 58, and airbag 60 are shown schematically for illustration purposes since they are known in the art and their construction forms no part of the invention. As will be understood by one of ordinary skill in the art, the shape of the airbag module 56, airbag inflator 58 and airbag 60 may vary from that shown, as is known in the art. The airbag module 56 includes a pair of channels 62. The channels 62 are shaped to slidably mate with a portion of the L-shaped brackets 54.

When the airbag 60 deploys it will initially be forced against the underside of the door flap 32 and the hinge member 36. The airbag 60 then ruptures the instrument panel body 22 along the tear seam 38 so that the portion of the instrument panel body 22 within the outlines of the tear seam 38 separates from the rest of the instrument panel body 22 and moves with the door flap 32. The hinge member 36 permits the door flap 32 to rotate outwardly so that the airbag 60 can be released into the passenger compartment. During and after deployment of the airbag 60 the weld joint 50 maintains the contact between the under face 48 and the outer rim 30 and between the under face 48 and the door flap 32. In this design the outer rim 30 surrounds the door flap 32 and the tear seam 38 thus the outer rim 30 supports the entire area of the instrument panel body 22 around the tear seam 38 and the door flap 32. This support of the instrument panel body 22 permits the instrument panel 20 to be designed with fewer support members.

In the design shown, each of the L-shaped brackets 54 extend along substantially an entire side 40 of the outer rim 30. Likewise, the channels 62 extend along substantially the entire width of the airbag module 56. As will be understood by one of ordinary skill in the art, the L-shaped brackets 54 or the channels 62 could be shorter. In addition, the support structure 52 could comprise a plurality of L-shaped brackets 54 along a side 40 of the outer rim 30 or the channels 62 could comprise a plurality of channels that mate with each L-shaped bracket 54.

Preferably, the airbag support assembly 28 is formed of a thermoplastic urethane. Also, it is most preferable that the outer rim 30 and the door flap 32 be vibration welded to the under face 48 of the instrument panel body 22 to form the welded joint 50. The vibration weld provides a very strong connection between the airbag support assembly 28 and the instrument panel body 22. This strong support enables the support structure 52 to be provided by the airbag support assembly 28 rather than the instrument panel body 22. Forming the airbag support assembly 28 from a thermoplastic also enables the outer rim 30 and the door flap 32 to conform to the shape of the under face 48 so the same standardized design can be used in instrument panels having a variety of configurations. Although the support structure 52 is shown as integral with the outer rim 30, as will be understood by one of ordinary skill in the art, the support structure 52 could be separate from the outer rim 30 and secured to the outer rim 30 by a welding technique as described above.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. An instrument panel comprising:

an instrument panel body having a front face and an under face, said under face having a tear seam to facilitate deployment of an airbag;

an airbag support assembly comprising an outer rim, a hinge member, a support structure and a door flap having a plurality of outer edges;

said outer edges spaced apart from, and inwardly of said outer rim to form a gap;

said hinge member connecting one of said plurality of outer edges to said outer rim;

said support structure secured to said outer rim and providing a support for an airbag module; and said outer rim and said door flap secured to said under face of said instrument panel.

2. An instrument panel as recited in claim 1, wherein said gap overlies said tear seam.

3. An instrument panel assembly as recited in claim 1, wherein said outer rim and said door flap are secured to said instrument panel body by welding.

4. An instrument panel assembly as recited in claim 1, wherein said airbag support assembly comprises a thermoplastic urethane.

5. An instrument panel assembly as recited in claim 1, wherein said hinge member is contiguous along substantially the entire length of one of said plurality of outer edges of said door flap.

6. An instrument panel assembly as recited in claim 1, wherein said support structure includes a plurality of brackets that extend rearwardly from said outer rim, a portion of each of said brackets receiving structure to mount an airbag module.

7. An instrument panel assembly as recited in claim 6, wherein said plurality of brackets comprises a pair of L-shaped brackets and each of said brackets is contiguous along substantially the entire length of a side of said outer rim.

8. An instrument panel assembly as recited in claim 6 further including an airbag module having an airbag inflator, an airbag and a plurality of channels, each of said channels slidably mating with a portion of one of said brackets, said brackets supporting said airbag module.

9. An airbag support assembly comprising:

an outer rim, a hinge member, a support structure and a door flap having a plurality of outer edges;

said outer edges spaced apart from, and inwardly of said outer rim to form a gap;

said hinge member connecting one of said plurality of outer edges to said outer rim;

said support structure secured to said outer rim and providing a support for an airbag module; and said outer rim and said door flap adapted to be welded to said under face of said instrument panel.

10. An airbag support assembly as recited in claim 9 wherein said airbag support assembly comprises a thermoplastic urethane.

11. An airbag support assembly as recited in claim 9, wherein said hinge member is contiguous along substantially the entire length of one of said plurality of outer edges of said door flap.

12. An airbag support assembly as recited in claim 9, wherein said hinge member is U-shaped.

13. An airbag support assembly as recited in claim 9, wherein said support structure includes a plurality of brackets that extend rearwardly from said outer rim, a portion of each of said brackets for receiving structure to mount an airbag module.

14. An airbag support assembly as recited in claim 13, wherein said plurality of brackets comprises a pair of L-shaped brackets and each of said brackets is contiguous along substantially the entire length of a side of said outer rim.

15. An airbag support assembly as recited in claim 13 further including an airbag module having an airbag inflator, an airbag and a plurality of channels, each of said channels slidably mating with a portion of one of said brackets, said brackets supporting said airbag module.

16. An instrument panel comprising:

an instrument panel body having a front face and an under face, said front face having no tear seam, said under face having a tear seam to facilitate deployment of an airbag;

an airbag support assembly comprising an outer rim, a hinge member, a support structure and a door flap having a plurality of outer edges;

said outer edges spaced apart from, and inwardly of said outer rim to form a gap;

said hinge member connecting one of said plurality of outer edges to said outer rim;

said support structure secured to said outer rim and providing a support for an airbag module; and said outer rim and said door flap welded to said under face of said instrument panel, said outer rim surrounds said door flap and said tear seam, thus said outer rim supports an entire area of said instrument panel body around said tear seam and said door flap.

17. An instrument panel assembly as recited in claim 16, wherein said airbag support assembly comprises a thermoplastic urethane.

18. An instrument panel assembly as recited in claim 16, wherein said support structure includes a plurality of brackets that extend rearwardly from said outer rim, a portion of each of said brackets receiving structure to mount an airbag module.

19. An instrument panel assembly as recited in claim 18, wherein said plurality of brackets comprises a pair of L-shaped brackets and each of said brackets is contiguous along substantially the entire length of a side of said outer rim.

20. An instrument panel assembly as recited in claim 18 further including an airbag module having an airbag inflator, an airbag and a plurality of channels, each of said channels slidably mating with a portion of one of said brackets, said brackets supporting said airbag module.

* * * * *